Sept. 8, 1925.  1,552,705
E. M. JOHNSON
VEHICLE SIGNAL
Filed Aug. 2, 1921  3 Sheets-Sheet 1
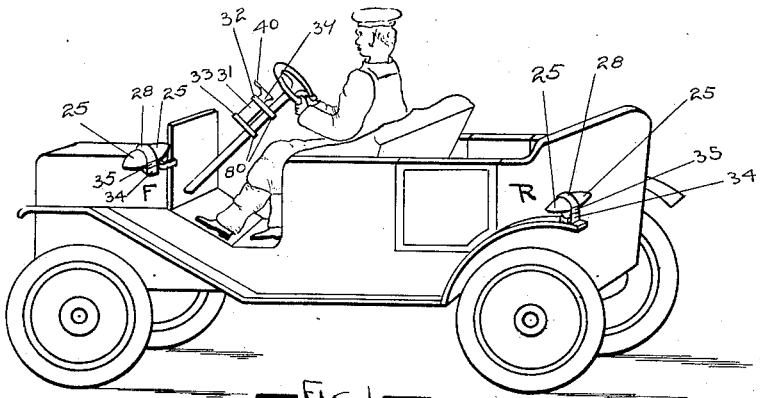
FIG.1
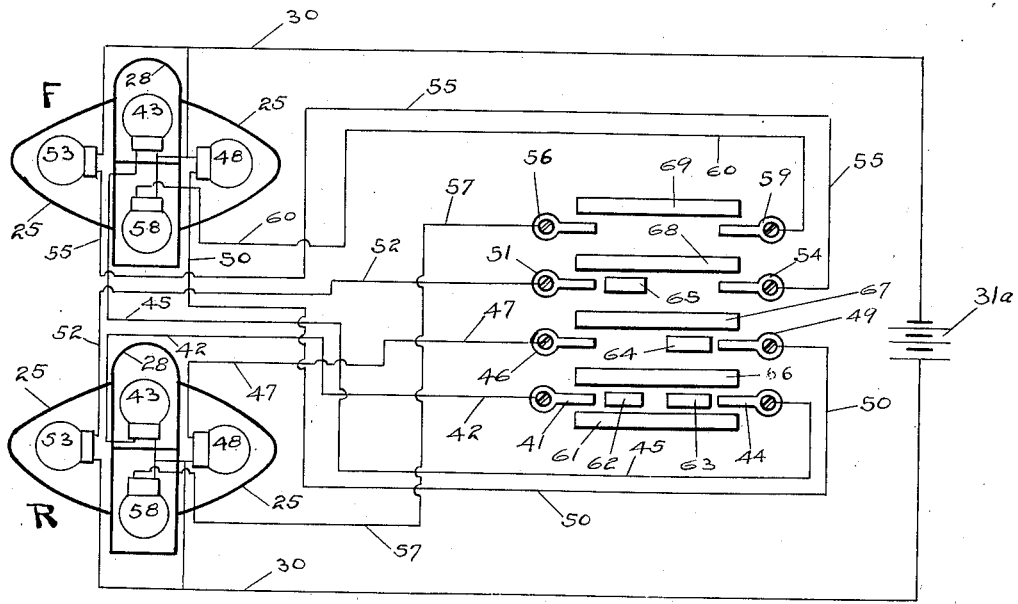
FIG.14
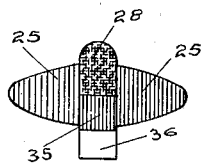
FIG.15
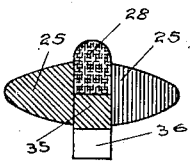
FIG.17
FIG.19
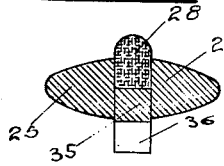
FIG.16
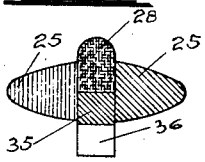
FIG.18
INVENTOR
EUGENE M. JOHNSON
BY C.F. Blake
ATTY.

Sept. 8, 1925.
E. M. JOHNSON
VEHICLE SIGNAL
Filed Aug. 2, 1921
1,552,705
3 Sheets-Sheet 2
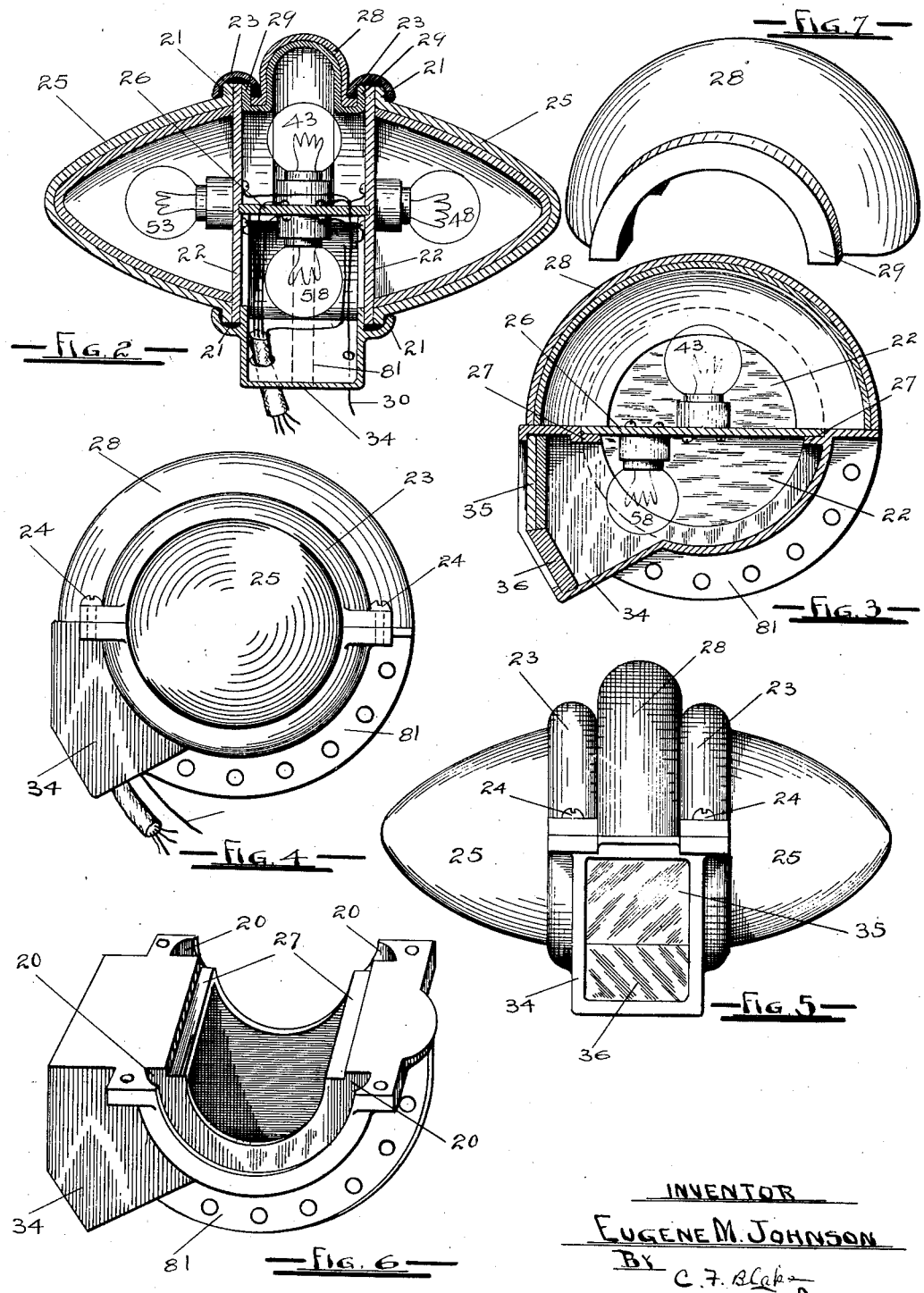

Sept. 8, 1925.

E. M. JOHNSON

VEHICLE SIGNAL

Filed Aug. 2, 1921

INVENTOR
EUGENE M. JOHNSON
BY C. F. Blake
ATTY.

Patented Sept. 8, 1925.

1,552,705

UNITED STATES PATENT OFFICE.

EUGENE M. JOHNSON, OF PORTLAND, OREGON, ASSIGNOR TO KARL J. SWENSON, OF PORTLAND, OREGON.

VEHICLE SIGNAL.

Application filed August 2, 1921. Serial No. 489,387.

*To all whom it may concern:*

Be it known that I, EUGENE M. JOHNSON, a citizen of the United States, residing at Portland, county of Multnomah, State of Oregon, have invented certain new and useful Improvements in Vehicle Signals, of which the following is a specification.

My invention relates to vehicle signals in general, and particularly to such signals as are adapted for use upon automobiles, the object being to provide a signal that may be seen either at night or day from any position of the observer relatively to the automobile, to provide a signal that imparts its message by means of changing colors of its various parts and thus eliminate moving parts and lettered signs, and to provide in such a device means of signaling a cautionary message only.

I accomplish the above objects, and other desirable results that will hereinafter appear, by means of the construction illustrated in the accompanying drawings, which are a part of this application for Letters Patent, like characters of reference indicating like parts throughout these several views thereof, and in which:

Fig. 1 is a perspective view of an automobile with my device mounted thereon.

Fig. 2 is a sectional elevation of the signal.

Fig. 3 is a transverse sectional elevation of the signal.

Fig. 4 is an end elevation of the signal.

Fig. 5 is a rear elevation of the signal.

Fig. 6 is a perspective view of the base of the signal.

Fig. 7 is a perspective view of the cautionary lens.

Fig. 14 is a wiring diagram of the device assembled.

Figure 8:
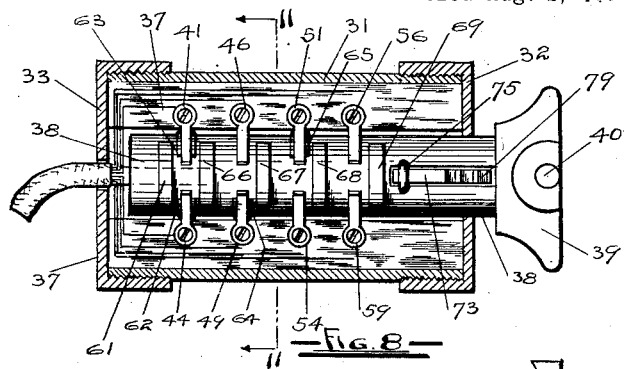
Fig. 8 is a sectional plan view of the switch.

Figs. 15 to 19 inclusive are illustrations of the various color combinations used in the signaling.

My device consists of two units, the signal and the operating switch, each of which is dependent upon the other for the production of a useful function, neither of which is useful without the other, and the two of which combine to form the subject of this application, a complete and useful vehicle signal.

The fundamental principle of the device is the provision of a plurality of lenses, globes or domes, hereinafter mentioned simply as globes, each containing an electric light, and each displaying a color when illuminated by said light different from that when not so illuminated; and an electric switch adapted for operating said electric lights in various combinations together or separately, thus displaying the colors of the globes in various combinations for signaling purposes. The globes are of various forms, such as parabolas of revolution, globoids, and the like, each mounted upon a base in a manner projecting therefrom. In this way are the various globes rendered visible from any position relative to the automobile from which position the signal is visible at all times, and also all reflection of sun light from the globes into the eyes of the observer is eliminated, and thus the signal is of much greater utility than signals that can be seen and understood only when the observer is either directly in front of or directly behind the automobile, or than signals displaying flat surfaces from which the sun light may be reflected into the eyes of the observer momentarily blinding him so that he may be unable to discern the import of the signal displayed.

In general my device consists of a signal unit mountable upon any desired part of an automobile or other vehicle and containing a plurality of electric lights, each of said lights being inclosed in a colored globe, and each of said globes being capable of changing its color when illuminated by its respective electric light; and a switch unit mounted conveniently for the driver of the vehicle, preferably upon the steering column in the case of an automobile, and adapted to operate so that said globes may be illuminated by their respective electric lights either singly or in groups and combinations, as desired by the driver of the vehicle. It is the various combinations and groupings of the colors of the signal globes that constitute the signal displayed.

The base of the signal is in the form of a hollow semicylindrical shell open at the top, as shown in detail in Fig. 6, and assembled with the other members of the signal in Figs. 2, 3, 4 and 5.

Upon each side of said base are provided grooves 20 into which flanges 21 of certain of said globes are inserted, as illustrated in Fig. 2. Also inserted within said grooves 20 are diaphragms 22 contacting with flanges 21. Said flanges 21 and their respective globes, and said diaphragms 22 are secured in place within the grooves 20 by means of suitable band clamps 23 coacting with said flanges 21 and diaphragms 22 and secured to said base by screws 24, as shown in Figs. 4 and 5.

Each of the globes integral respective to the flanges 21 are formed of a shape resembling a paraboloid of revolution, as shown at 25; and each of these globes is of a different color externally and internally thereof. This may be accomplished in various ways, either by forming the globes of two separable portions as illustrated in Fig. 2, the outer portion being of green or other color glass and the inner portion being of red or other color glass, or by coloring the outer and inner surfaces of the globes.

The diaphragms 22 are made of opaque electrical insulating material upon which an electric lamp may be mounted, and thus the globes 25 and their respective diaphragms 22 form together an inclosed compartment entirely separated in a lightproof manner from all other compartments of the signal unit.

The diaphragms 22 are connected by a diaphragm 26 which also rests upon suitable seats 27 therefor in the base of the signal unit, thus dividing the space between diaphragms 22 into an upper and a lower compartment, each separated in a light proof manner from all other compartments of the signal unit. The diaphragm 26 is of suitable opaque electrical insulating material, and electric lamps are mounted thereon within the respective chambers into which said diaphragm 26 divides the space between the diaphragms 22, as shown in Figs. 2 and 3.

The upper of said chambers between the diaphragms 22 is covered by a transparent globe 28 of semi-circular section invertedly mounted upon the base of the signal unit, and secured thereon by means of flanges 29 coacting with and embraced by the clamping bands 23, as shown in Fig. 2. The globe 28 is of similar formation as above described for globes 25, and is green outside and yellow inside.

One of the terminals of each of said electric lamps is connected to a common wire 30 which wire is connected to one of the electrodes of a battery 31, or other source of electric current, the wire 30 from the front signal unit being connected to one of said electrodes and the wire 30 from the rear signal unit being connected to the other of said electrodes, so that the corresponding electric lamps in the front and rear signal unit are in series with each other and with the source of electric current, as shown in Fig. 14. The other terminal of each electric lamp in the front signal unit is connected to a terminal on one side of the switch unit, each switch terminal being respective to its lamp, and the other terminals of corresponding lamps in the rear signal unit are respectively connected to terminals upon the opposite side of said switch unit, the switch terminals of corresponding lamps in the front and rear signal units being diametrically opposite in the switch unit, as shown in Fig. 14.

The lower of the compartments between the diaphragms 22 is provided with a rearwardly projecting extension 34 terminating in an upper and lower pane 35 and 36 respectively, pane 35 being of similar construction to the globes previously described, and being colored green outside and red inside, and pane 36 being of clear glass or the like. The pane 35 faces rearwardly and lies in a substantially vertical plane, and the pane 36 faces rearwardly and lies in an inclined plane so that the light therefrom is directed downwardly and rearwardly to strike the ground at a convenient distance rearwardly of the signal unit. The pane 35 constitutes the signal for stopping or backing, and the light from the pane 36 in striking the ground behind the vehicle forms a guiding light for the driver when backing the vehicle.

Figure 11:
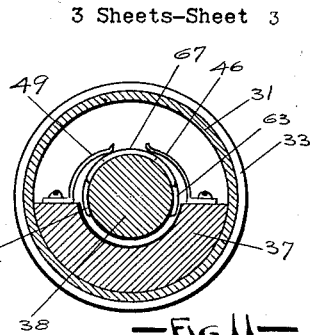
Fig. 11 is a section upon line 11—11 of Fig. 8.
Figure 12:
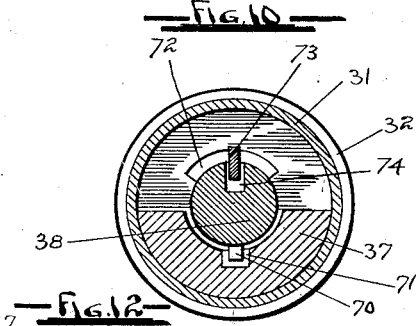
Fig. 12 is a section upon line 12—12 of Fig. 9.

The switch unit is inclosed within a cylindrical shell 31 having front and rear heads 32 and 33 respectively secured thereto. Within said shell, and secured thereto, is mounted a semicylindrical insulator 37 with its flat faces substantially diametrically disposed within said shell, as shown in Figs. 11 and 12. Rotatably mounted within said switch unit is a longitudinally slidable bore 38 terminating outside the head 32 in a knob 39 and a handle 40, said core being of electrical insulating material. Peripherally mounted upon said core are certain contact pieces hereinafter to be described, and mounted upon the diametrically disposed faces of the insulator 37 are certain oppositely disposed terminals arranged in pairs.

Terminal 41 is connected by wire 42 to lamp 43 within the globe 28 of the rear signal unit R, and terminal 44 opposite terminal 41 in the switch unit is connected by wire 45 to corresponding lamp 43 in the front signal unit.

Terminal 46 is connected by wire 47 to lamp 48 within the right hand globe 25 of the rear signal unit, and terminal 49 opposite terminal 46 is connected by wire 50 to lamp 48 within the righthand globe 25 of the front signal unit.

Terminal 51 is connected by wire 52 to the lamp 53 within the lefthand globe 25 of the rear signal unit, and terminal opposite terminal 51 is connected by wire 55 to lamp 53 within the lefthand globe 25 of the front signal unit.

Terminal 56 is connected by wire 57 to lamp 58 within the panes 35 and 36 of the rear signal unit, and terminal 59 opposite terminal 56 is connected by wire 60 to lamp 58 within the panes 35 and 36 of the front signal unit.

By this system of wiring the lamps in pairs, that is the corresponding lamps of the front and rear signal units, connected to oppositely disposed terminals within the switch unit, the two lamps are in series with each other and with the source of electric current 31$^a$ when the terminals respective thereto are connected within the switch unit.

The said terminals are disposed over the core 38 so as to be connected when the contacts upon said core are brought into cooperation with their respective oppositely disposed terminals.

The contact 61 is adapted to connect the terminals 41 and 42 when the core 38 is moved forward by pulling upon the knob 39, and to retain said terminals in connected condition as the core 38 is rotated to either the right or left by the handle 40. Thus, by pulling upon knob 39 the lamps 43 within the globes 28 are lighted, displaying the signal which means caution. This signal will be used when the vehicle is about to enter a traffic congestion, a bad piece of road, or to encounter any other obstruction to continued travel, and is a notice to following vehicles to slow down and use care. If, when in central position, the core 38 is rotated to either the right or the left the contacts 62 and 63 respectively will connect the terminals 41 and 44, and thus display the caution signal.

If, when the core 38 is in central position it is rotated to the right contact 64 will connect terminals 46 and 49 thus lighting the lamps 48 within the righthand globes 25 of both front and rear signal units, indicating the intention of making a turn to the right. Simultaneously also, the caution signal will be displayed because of the contact 63 connecting the terminals 41 and 44.

If, when the core 38 is in central position, it is rotated to the left contact 65 will connect terminals 51 and 54, thus lighting the lamps 53 within the left hand globes 25 of both front and rear signal units, indicating the intention of making a turn to the left.

Simultaneously also, the caution signal will be displayed because of the contact 63 connecting the terminals 41 and 44.

Thus it is obvious that one of the features of my device is the displaying of a caution signal simultaneously with a signal indicating an anticipated turn to either the right or the left, thus commanding the attention and observation of others to a greater extent than if only one signal is displayed.

If the core 38 is pushed inward or rearward within the switch unit the contact 66 will connect the terminals 41 and 44, the contact 67 will connect the terminals 46 and 49, the contact 68 will connect the terminals 51 and 54, and the contact 69 will connect the terminals 56 and 59. Thus it is seen that in this position of the core all the various lamps in each signal unit are lighted, signifying a stop is intended.

When all the lamps are out the globes 25, 28 and pane 35 all show green, that being the color of the outsides of each of these globes, and the signal units show as illustrated in Fig. 15. This is the condition of the signal units when the vehicle is running straight ahead.

When only the lamps 38 are lighted, the globes 25 and pane 35 show green as when running, but the globes 28 show yellow, that being the color of the interior of those globes, and the signal units show as illustrated in Fig. 16. This is the condition of the signal units when the vehicle is about to enter a congestion of traffic, a bad piece of road, or for any other reason caution is necessary upon the part of the driver of any following vehicle.

When all the lamps are lighted, the globes 25 and pane 35 will appear red, and the globe 28 will appear yellow, that being the signal indicating a stop, and illustrated in Fig. 17.

When lamps 43 and 53 are lighted the globes 25 on the left hand sides of the two signal units will appear red, and both the globes 28 will appear yellow, all other globes appearing green. This indicates an anticipated turn to the left, and is illustrated in Fig. 18.

When the lamps 48 and 43 are lighted the globes 25 on the right hand sides of the two signal units will appear red, and both the globes 28 will appear yellow, all other globes appearing green. This indicates an anticipated turn to the right, and is illustrated in Fig. 19.

The panes 36 being clear or transparent, shows no change of color, but simply serves as guiding light for the driver, as before explained.

Figure 9:
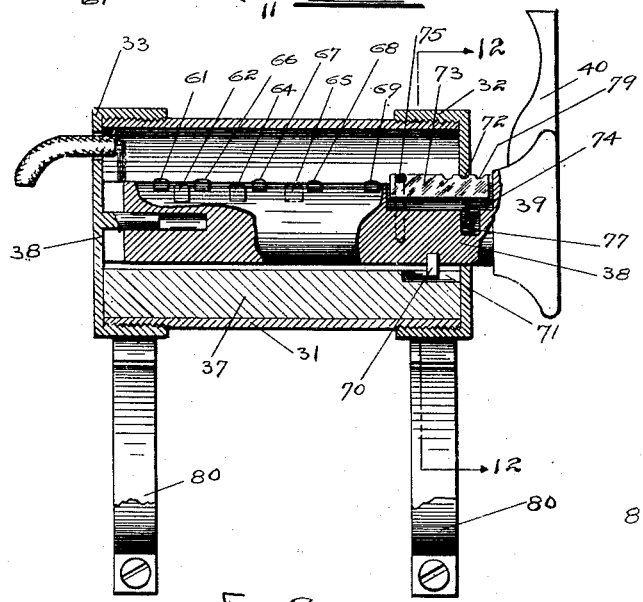
Fig. 9 is a sectional elevation of the switch.
Figure 10:
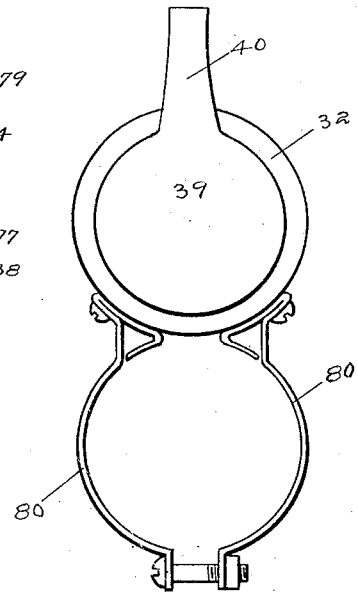
Fig. 10 is an end elevation of the switch.

For the purpose of limiting the longitudinal movement of the core 38 I provide thereon a pin 70 which pin projects into a slot 71 in the insulator 37, as shown in Figs. 9 and 12.

To limit the arc of rotation of the core 38 I provide a quadrant like slot 72 in the head 32 and a key 73 mounted within a slot 74 in the core 38, said key projecting through said slot 72 and contacting with the ends thereof to limit the angular movement of the core 38.

Figure 13:
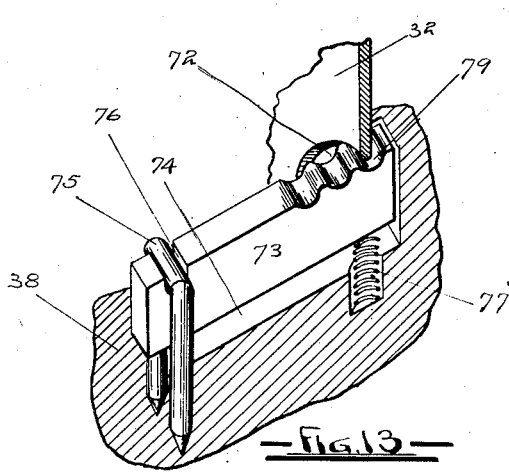
Fig. 13 is a perspective view of the switch stop device.

It is desirable that there shall be a slight resistance to the longitudinal movement of the core as each of the terminals contacts with its respective contact pieces so that the operator of the switch unit may feel when the contacts are obtained, and this I accomplish by rotatably mounting said key 73 in slot 74 by means of a U staple 75 disposed over one end of said key and engaging a notch 76 in the upper edge of said key, thereby providing a pivotal point about which said key may oscillate, and beneath the opposite end of said key I provide a spring 77 which keeps the key 73 always in contact with the edge of the slot 72, as shown in Figs. 9 and 13. That portion of the upper edge of said key which is in contact with the edge of the slot 72 is corrugated as at 79, there being as many corrugations as there are positions of the core 38 longitudinally of the switch unit, each corrugation corresponding to one of such positions. By this construction the operator may feel when the core has reached a desired position by the resistance offered by said corrugations.

The switch unit is mounted upon the steering column by means of suitable clamps 80, and the signal unit is provided with a rib 81 to which may be attached any desirable style of bracket or attachment member for mounting the signal unit in the desired location upon the vehicle.

My device may be made of any size, and constructed of any material deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

It is to be understood that while specific colors of the various parts of the globes may be referred to herein, no limitation is intended by such, as the purpose of the invention is to provide a globe which when illuminated from within shows one color, and when seen by reflected natural light shows another color, and the combination of colors to be used in any one instance is to be such as to permit this result.

Since it is impossible to transmit any appreciable amount of light of one pure color through a glass of another pure color, it is furthermore understood that the color of the outer surfaces of the members 25—28 and 35 are sufficiently light in tint to be visibly overcome by brilliant illumination of the colors on the inner surfaces.

Having disclosed my invention so that others may be enabled to construct and to use the same, what I claim as new, and desire to secure by Letters Patent is:

1. A signaling device, comprising a base formed with a semi-circular groove at opposite sides, a pair of globes having annular rims mounted in the grooves in the base and extending from each side thereof, an indicator globe mounted on and above the base of semi-circular form and fitting between the upper portions of said pair of globes, semi-circular bands secured to the base for securing the globes thereto, a pane mounted in the base, partitions forming separate compartments for each globe and pane, and electrical means for illuminating each globe and pane, whereby they may be illuminated in varying combinations for producing signals, said indicator globe being illuminated when signaling for indicating the operation of the device.

2. A signaling unit, including a base supporting circular partitions, a partition arranged transverse the circular partitions and dividing the space between such circular partitions into upper and lower compartments, a globe carried in contact with each circular partition and extending outwardly therefrom, a globe carried in contact with the circular partitions and inclosing the space therebetween and above the transverse partition, and a pane carried by the base and inclosing the space below the transverse partition and between the circular partitions, and independent illuminating means within each compartment.

In witness whereof I claim the foregoing as my own, I hereunto affix my signature, at Portland, county of Multnomah, State of Oregon, this 27th day of July 1921.

EUGENE M. JOHNSON.